United States Patent [19]

Fox

[11] 4,246,244

[45] Jan. 20, 1981

[54] PROCESS FOR SCAVENGING HYDROGEN SULFIDE FROM HYDROCARBON GASES

[75] Inventor: Irwin Fox, Ballwin, Mo.

[73] Assignee: Gas Sweetener, Inc., St. Louis, Mo.

[21] Appl. No.: 44,026

[22] Filed: May 31, 1979

Related U.S. Application Data

[63] Continuation-in-part of Ser. No. 963,797, Nov. 27, 1978, abandoned, and Ser. No. 939,441, Sep. 5, 1978, abandoned, said Ser. No. 963,797, is a continuation-in-part of Ser. No. 754,453, Dec. 27, 1976, abandoned, which is a continuation-in-part of Ser. No. 666,193, Mar. 12, 1976, Pat. No. 4,008,775, and Ser. No. 666,760, Mar. 16, 1976, abandoned, each is a continuation-in-part of Ser. No. 374,555, Jun. 28, 1973, abandoned, said Ser. No. 939,441, is a continuation-in-part of Ser. No. 666,760, Mar. 16, 1976, abandoned.

[51] Int. Cl.$^3$ .............................................. B01D 53/34
[52] U.S. Cl. .................................. 423/225; 423/231; 423/562; 423/573 G; 423/632
[58] Field of Search ............... 423/225, 230, 231, 562, 423/573 G, 632, 633; 175/64, 66; 252/8.5 E, 8.55 B, 8.55 E; 75/25

[56] References Cited

U.S. PATENT DOCUMENTS

| | | | |
|---|---|---|---|
| 1,160,375 | 11/1915 | Burhheiser | 423/225 |
| 1,734,307 | 11/1929 | Sperr, Jr. | 423/225 |
| 1,849,428 | 3/1932 | Laux | 423/632 |
| 2,122,236 | 6/1938 | Nichols et al. | 252/8.5 B |
| 3,301,323 | 1/1967 | Parsons | 175/64 |
| 3,887,474 | 6/1975 | Senfe et al. | 423/633 X |
| 4,008,775 | 2/1977 | Fox | 175/64 |
| 4,025,604 | 5/1977 | Moriguchi et al. | 423/239 A |

FOREIGN PATENT DOCUMENTS 495690   9/1953   Canada .................................. 423/632

OTHER PUBLICATIONS

Milbourne, "The Removal of Hydrogen Solfide from Gas by Means of Iron Oxide With Special Reference to Humidity Conditions", John Hopkins University, 1930, pp. 9 & 10.

*Primary Examiner*—Earl C. Thomas
*Attorney, Agent, or Firm*—Jerome A. Gross

[57] ABSTRACT

A process for scavenging hydrogen sulfide from hydrocarbon gases utilizes iron oxide particles of unique chemical and physical properties. These particles have large surface area, and are comprised substantially of amorphous $Fe_2O_3$ containing a crystalline phase of $Fe_2O_3$, $Fe_3O_4$ and combinations thereof. In scavenging hydrogen sulfide, the iron oxide particles are suspended in a liquid which enters into intimate mixing contact with hydrocarbon gases; the hydrogen sulfide is reacted at an exceptional rate and only acid-stable reaction products are formed. Thereafter, the sweetened hydrocarbon gases are collected.

10 Claims, No Drawings

PROCESS FOR SCAVENGING HYDROGEN SULFIDE FROM HYDROCARBON GASES

This application is a continuation-in-part of Ser. No. 963,797, filed Nov. 27, 1978, entitled *USE OF STEEL PLANT WASTE DUSTS FOR SCAVENGING HYDROGEN SULFIDE,* co-pending, which is a continuation-in-part of Ser. No. 754,453, filed Dec. 27, 1976, entitled *USE OF STEEL PLANT WASTE DUSTS FOR SCAVENGING HYDROGEN SULFIDE,* now abandoned, which Ser. No. 754,453 is a continuation-in-part of the following applications:

Ser. No. 666,193, filed Mar. 12, 1976, entitled *METHOD OF USING A POROUS $Fe_3O_4$ DRILLING MUD ADDITIVE,* now U.S. Pat. No. 4,008,775, issued Feb. 22, 1977, and Ser. No. 666,760, filed Mar. 16, 1976, entitled *SLURRY METHOD AND APPARATUS FOR SWEETENING HYDROCARBON GAS,* now abandoned;

both of which applications were continuations-in-part of Ser. No. 374,555, filed June 28, 1973, entitled *POROUS $Fe_3O_4$ DRILLING MUD ADDITIVE,* now abandoned;

this application is also a continuation-in-part of Ser. No. 939,441, entitled *SLURRY METHOD FOR SWEETENING HYDROCARBON GAS,* filed Sept. 5, 1978, co-pending but to be abandoned, and now abandoned, which is a continuation-in-part of said application Ser. No. 666,760.

BACKGROUND OF THE INVENTION

Hydrogen sulfide has been removed previously from hydrocarbon gases utilizing iron oxides. U.S. Pat. No. 1,160,375 (Burkheiser) teaches that $H_2S$ may be removed from hydrocarbon gases containing ammonia by reaction with $Fe_2O_3$ and free sulfur. The reaction product, $Fe_2S_3$, is unstable in air, regenerating the $Fe_2O_3$ and liberating $H_2S$ which is reacted with ammonia in a second step to produce forms of ammonium sulfide. U.S. Pat. No. 1,734,307 (Sperr) discloses a method of removing hydrogen sulfide by first reacting the $H_2S$ with an alkali such as sodium carbonate, and further reacting the resulting hydrogen sulfide salt with $Fe_2O_3$ to form $Fe_2S_3$. Canadian Pat. No. 495,690 (Meuser) teaches that an $H_2S$-reactive iron oxide is produced during iron-mediated nitroaromatic reductions in the presence of both sulfuric acid and aluminum chloride. The iron oxide so produced is composed entirely of $Fe_2O_3$ and in reaction with hydrogen sulfide, forms an unstable iron sulfide which regenerates $H_2S$ upon acidification.

The foregoing methods appear to be effective only where the concentration of hydrogen sulfide is low, that is, not in excess of about 15 ppm. Further, all of these iron oxides in reaction with $H_2S$ produce unstable products upon exposure to air or acids.

SUMMARY OF THE INVENTION

The present invention provides a method of scavenging hydrogen sulfide from hydrocarbon gas utilizing exceptionally $H_2S$-reactive iron oxide particles. These particles generally comprise forms of iron oxide of large surface area having an amorphous (non-crystalline) moiety of $Fe_2O_3$ together with an $Fe_3O_4$ or $Fe_2O_3$ crystalline phase, and impurity levels in bulk of less than 10.0% with respect to any contaminating element. Upon reaction with hydrogen sulfide, the iron oxides are converted to products which do not regenerate hydrogen sulfide in the presence of strong acids.

The principal object of the present invention is to provide a process for scavenging hydrogen sulfide from hydrocarbon gas, regardless of its concentration. A further purpose is to produce, in the reaction with hydrogen sulfide, reaction products which do not readily regenerate hydrogen sulfide gas in the presence of air or dissolved acids. A still further object is to provide a process in which $H_2S$ may be scavenged from hydrocarbon gas over a broad acidic-alkaline pH range and from any liquid in which the defined iron oxide particles may be suspended.

Briefly summarizing, and without limitation, the method of the present invention comprises suspending the particles in a liquid to form a slurry, contacting the particles so suspended with hydrocarbon gas containing hydrogen sulfide, conveniently by bubbling or otherwise mixing the gas into the slurry and reacting the hydrogen sulfide with the particles to form acid-stable products of reaction comprising principally $FeS_2$, $S°$, $Fe_3S_4$ and other stable, non-FeS iron sulfide species, as the purified gas escapes from the slurry.

Simple apparatus serves to carry out the process, and includes conventional scrubbing columns, bubble chambers, and mixers such as static mixers. While the efficacy of $H_2S$-scavenging will vary for different types of apparatus, generally any such apparatus will serve which brings a gaseous hydrocarbon phase containing $H_2S$ into intimate mixing contact with the liquid-suspended particles.

The amount of iron particles required for effective $H_2S$ removal will vary with $H_2S$ concentration and the degree of liquid-gas mixing. For hydrocarbon gases containing high $H_2S$ residuals and for apparatus wherein liquid-gas mixing is relatively inefficient (as in a conventional scrubbing column), the iron oxide content of slurries may be conveniently increased to provide an amount sufficient for effective scavenging. Alternatively, at low $H_2S$ residuals, iron oxides having lower rates of reaction, but which fix the sulfur under highly acidic conditions, may be preferable.

DESCRIPTION OF THE PREFERRED EMBODIMENT

In the method of the present invention, iron oxide particles having unique physical and chemical properties are utilized in scavenging hydrogen sulfide from hydrocarbon gases. In contrast to those gas sweetening processes in which the gas passes through only slightly moistened beds of reactive material, and to those processes in which liquid bearing such material is sprayed downward within packed towers, in the present process the hydrocarbon gas polluted by hydrogen sulfide is bubbled through a liquid slurry of reactive particles under conditions hereafter more fully described which allow for full reaction; the hydrogen sulfide is reacted in the liquid slurry to a point that it is either completely eliminated or reduced to within the permissible limit of 4 ppm; and the purified gas is gathered from the upper surface of the liquid slurry.

The reactive particles utilized in the present process may be derived from several sources and may be prepared under various conditions. One such particle (hereinafter referred to as compound A) is described in my U.S. Pat. No. 4,008,775, and is prepared conventionally by controlled low temperature oxidation of iron. Other particles are obtained as the iron oxide waste dusts from steelmaking, as disclosed in my co-pending application, Ser. No. 963,797, entitled USE OF STEEL PLANT WASTE DUSTS FOR SCAVENGING HYDROGEN SULFIDE. These may be open hearth dust (hereinafter referred to as compound B) or basic oxygen furnace dust (hereinafter referred to as compound C) and are formed upon rapid solidification of iron droplets or vapor, as upon contact with furnace flue surfaces. Yet another useful particle (hereinafter referred to as compound D) is formed upon conventional high temperature oxidation of ferrous sulfate with rapid cooling. In general, I have found that any iron oxide will be effective in the defined process, regardless of source or method of manufacture, provided that it has the physical and chemical properties as hereinafter more fully described.

Table I lists representative iron oxides of the present invention (compounds A-D) together with control and prior art iron oxides, and summarizes those physical and chemical properties, hereinafter explained, which are found to be significant.

TABLE I

| Iron Oxide | Fe ESCA/ AUGER | X-ray Diffraction unreacted | X-ray Diffraction reacted | Kinetic "K" value | acid stability | surface area $m^2/g$ |
|---|---|---|---|---|---|---|
| A | $Fe_2O_3$ | $Fe_3O_4$ | $FeS_2$, $Fe_3S_4$, $FeS°$ | 2000 | 86.6% | 7.0 |
| B | $Fe_2O_3$ | $Fe_2O_3/Fe_3O_4$ | $FeS_2,S°$ | 36.3 | 73.7% | 9.0 |
| C | N.A. | $Fe_2O_3/Fe_3O_4$ | $FeS_2,S°$ | 100 | 93.8% | 4.0 |
| D | $Fe_2O_3$ | $Fe_2O_3$ | $FeS_2$ | 4000 | 85.0% | 4.0 |
| O*[2] | $Fe_3O_4$ | $Fe_3O_4$ | N.A. | <1.0 | 18.7% | 1.0 |
| P[3] | N.A. | $Fe_3O_4$ | $FeS_x$ | <1.0 | 20.0% | 1.0 |
| Q[4] | $Fe_2O_3$ | $Fe_2O_3$ | $FeS$, $Fe_2S_x$ | 1.2 | 18.6% | 14.0 |
| R[5] | N.A. | N.A. | N.A. | <1.0 | 50.0% | N.A. |

N.A. = not analyzed
[2] = magnetite
[3] = hematite
[4] = iron oxide made according to the method of Meuser, Canadian Pat. No. 495,690
[5] = millscale Samples of various effective particles were subjected to ESCA and AUGER analysis. In ESCA spectroscopy, a beam of monochromatic X-rays impinge upon the atoms at a sample surface, striking electrons and displacing them at energy levels characteristic for each valence state of element present. AUGER spectroscopy is similar to ESCA, except that the sample is bombarded with high-energy electrons instead of X-rays. AUGER electrons are emitted at characteristic energies for the various elements in particular valence states. These techniques analyze only the sample surface (less than 100 A° interior to the sample) in contrast to X-ray fluorescence which quantifies elements detected in bulk.

X-ray diffraction analysis detects only the crystalline phase of iron oxides; it will not yield a diffraction pattern for any iron oxide in which the Fe and O atoms are not organized into a crystalline lattice structure. It is concluded, from comparison of the ESCA/AUGER analysis and X-ray diffraction, that the $Fe_2O_3$ detected at the surface of any particle must be at least partially non-crystalline (amorphous).

Referring to Table I, ESCA/AUGER analysis of the present compound classes A, C and D shows that the surface of the particles comprises exclusively $Fe_2O_3$, regardless of crystalline content revealed by X-ray diffraction, which may be $Fe_3O_4$, $Fe_2O_3$ and combinations thereof. In the case of compound A, all of the $Fe_2O_3$ present must be amorphous since the only crystalline phase detected by X-ray diffraction analysis is $Fe_3O_4$. The amorphous nature of the $Fe_2O_3$ compounds of B and C is confirmed upon ion titration analysis, as hereinafter more fully described. The amorphous nature of the $Fe_2O_3$ in compound D cannot be directly determined since all of the iron is present in its highest oxidation state as $Fe^{+++}$; however, the amorphous property may be inferred from the high kinetic K value of reaction with hydrogen sulfide; also, compound D appears to have a relatively low density compared to that of crystalline hematite (data not shown).

The amorphous $Fe_2O_3$ moiety of compound classes A, B and C was further identified by ion titration analysis. In ion titration, the amounts of iron in the $Fe^{++}$ and $Fe^{+++}$ oxidation states are measured simultaneously and compared to corresponding values for pure $Fe_2O_3$ and $Fe_3O_4$ standards. If the particles were composed substantially of $Fe_3O_4$, as indicated by strong X-ray diffraction patterns, then the ferric ($Fe^{+++}$) content would approximate 47.7% of the total iron, and $Fe^{++}$ iron would be present at approximately 27.6%.

Ion titration performed on the present iron oxide powders (compound classes A, B and C) shows that $Fe^{+++}$ content is much higher than would be predicted by X-ray diffraction analysis; $Fe^{++}$ levels are correspondingly lower than for the pure $Fe_3O_4$ standard (see Table II).

TABLE II

| | Ion Titration* | | |
|---|---|---|---|
| Iron Oxide | $Fe^{++}$(%) | $Fe^{+++}$(%) | Total Fe |
| A | 11.3 | 57.0 | 68.3 |
| B | 3.6 | 24.7 | 28.3 |
| Pure $Fe_2O_3$ | 2.8 | 67.2 | 70.0 |
| Pure $Fe_3O_4$ | 27.6 | 47.7 | 72.3 |

*Method of Kolthoff and Sandell

Thus, these particles have an $Fe^{+++}$ content intermediate to that for pure standards of $Fe_2O_3$ and $Fe_3O_4$. It is concluded that the excess of iron in the $Fe^{+++}$ valence state is present in non-crystalline form as an amorphous $Fe_2O_3$. The $Fe_2O_3$ stoichiometry is confirmed by the ESCA and AUGER spectroscopy described hereinabove.

Applicant knows of no technical literature in which such tests have been correlated or conclusions drawn therefrom. As a possible explanation (but without limitation), it may be theorized that each of the present particles consists of a core comprising crystalline $Fe_3O_4$, $Fe_2O_3$ and combinations, thereof, surrounded by an amorphous (non-crystalline) $Fe_2O_3$ layer. Reaction with hydrogen sulfide may initiate within the amorphous $Fe_2O_3$ layer and proceed into the crystalline core portion. Kinetic analysis, as hereinafter more fully described, indicates a substantially uniphasic reaction, i.e., reaction proceeds uniformly through the core at substantially similar rates to the initial reaction within the amorphous portion, and obeys the same rate law. This suggests that initial reaction energetically primes a subsequent reaction within the crystalline phase. In contrast, in the absence of an amorphous layer, as in mineral magnetite and hematite, reaction proceeds very slowly since the crystal lattice bonding must be overcome before Fe atoms are displaced and made available for chemical reaction.

The proportion of crystalline material ($Fe_2O_3$ or $Fe_3O_4$) in the present particles does not appear to be critical. The $Fe_3O_4$ crystalline portion of compound A is approximately 50% by weight of the total particle; whereas in compound B (open hearth dust) the crystalline phase constitutes only about 9% of the total weight.

In the present process, a liquid slurry of iron oxide particles is contacted with hydrocarbon gas containing hydrogen sulfide. As indicated by the kinetic data hereinafter described, rates of reaction (of fast-reacting compounds A and D) at acidic pH may be 1,000-fold greater than at alkaline pH. However, such a rapid reaction rate is not the only parameter of effectiveness of $H_2S$ scavenging. In the aqueous dissociation of dissolved $H_2S$ to $HS^-$ and $H^+$, increased acidity increases the partial pressure of $H_2S$ in water in accordance with Henry's law. This means that there will be $H_2S$ residuals in sweetened hydrocarbon gas, which may actually be greater at lower pH where the rate of reaction is faster than at pH greater than 7. Further, even at pH greater than 7, reaction products of the present iron oxides are acid-stable. Accordingly, in an aqueous suspension of the particles, overall $H_2S$ removal may be more efficient at pH greater than 7 even for compounds A and D; and the apparent sacrifice of reaction speed may be compensated by utilizing greater concentrations of the iron oxide.

These factors will be important where hydrocarbon gas flow is relatively rapid and where $H_2S$ content is high. Iron oxide concentration, pH and flow rate can readily be adjusted in the present process to achieve the desired $H_2S$ residual. By commercial standard, a residual of 4 ppm $H_2S$ is tolerated.

Compounds B and C, having a combination of $Fe_2O_3$ and $Fe_3O_4$ crystalline phases, demonstrate lower reaction efficiency (Table I, kinetic K values) than either compounds A or D whose respective $Fe_3O_4$ or $Fe_2O_3$ crystalline phases are substantially pure; but both compounds B and C have unusually stable reaction products. Therefore these compounds are adequately useful in the method of the present invention wherein hydrogen sulfide residuals are present in hydrocarbon gases in low concentrations; in such situations, it is important merely that dissolved sulfides be removed as acid insoluble products of reaction, so as to avoid the regeneration of $H_2S$ gas.

Reaction kinetics of various iron oxides in reaction with hydrogen sulfide were compared to kinetic results reported in the literature. In the pH range 8–10, the derived rate law for compound A is as follows:

$$\frac{d[S_t]}{dt} = -K \times [S_t]^2 \times [H^+]^{1.06} \times [A]$$

wherein $[S_t]$ is sulfide concentration in ppm, t is time in minutes, $d[S_t]/dt$ is the instantaneous rate of change of dissolved sulfide concentrations, $[H^+]$ is hydrogen ion concentration and $[A]$ is iron oxide concentration (lb/bbl). K is the rate constant in $min^{-1} ppm^{-1} cm^{-2} \times 1/mole$ and equal to approximately 3,000. At pH 8–10, the derived rate law agrees closely with Rickard's analysis of the reaction of hydrated iron oxide (ferric hydroxide) and hydrogen sulfide [Am. J. Sci., 274:941 (1974)].

Substitution of observed $[S_t]$ and $[H^+]$ values at low pH into the rate law equation hereinabove, yields apparent K values which define relative differences in reaction rates among different compounds. In general, it is found that any iron oxide particle attaining a maximum K value greater than 20 when $[S_t]$ and $[H^+]$ are measured intermittently during the course of continuous acidic reaction, will be satisfactorily effective in the defined process.

The kinetic K values for each of the present iron oxides and control materials are summarized in Table I. Only the compounds of classes A-D have kinetic K values greater than 20, and so would be of sufficient practical reactivity with hydrogen sulfide over both an alkaline and acidic pH range. In contrast, all of the prior art iron oxides give maximum K values of approximately 1.0 or less when measured at acidic pH.

In scavenging hydrogen sulfide from hydrocarbon gases, iron oxides have heretofore been known to form chiefly unstable products of reaction such as $Fe_2S_3$ (ferric sulfide) and FeS (ferrous sulfide), together with lesser amounts of stable species such as $FeS_2$ and $S°$. The unstable products rapidly regenerate $H_2S$ upon acidification. Even if the reaction with hydrogen sulfide itself is conducted under alkaline conditions so as to fix the sulfides in solution (as taught by Sperr, U.S. Pat. No. 1,734,307), there is substantial danger of $H_2S$ release from the consumed particles upon acidification through later contact with atmospheric $CO_2$.

The iron oxide particles used in the present process produce unexpectedly stable reaction products even in the presence of strong inorganic acids. In my prior co-pending application Ser. No. 939,441, these products for compound A were identified as $FeS_2$, $S°$ and $Fe_3S_4$ by X-ray diffraction. Since X-ray diffraction is essentially semi-quantitative, revealing only materials having a defined crystalline structure, a more functional test of reaction product stability was developed.

In this assay, ferrous sulfide (FeS) was prepared by the reaction of $Fe(NH_4)_2(SO_4)_2$ and $Na_2S$ in water; a black FeS precipitate was recovered and washed to remove unreacted sulfides. In water solution (200 mls.), the FeS precipitate (2400 total ppm sulfide) rapidly regenerates $H_2S$ upon addition of strong acid (10 mls. concentrated HCl). The liberated $H_2S$ is bubbled into a $ZnCo_3$ trap and assayed. In the test series, the iron oxides of Table I were introduced individually into the 200 ml. slurry prior to acidification. Strong acid was then added and the amount of $H_2S$ recovered in a zinc carbonate trap measured after one-half hour. The rationale of these experiments is as follows: if the $H_2S$ liberated from the FeS precipitate upon acidification reacts with the iron oxide to produce FeS or other species of iron sulfide unstable in the presence of acid, these unstable reaction products will regenerate sulfide as $H_2S$ gas which bubbles into the zinc carbonate trap. However, if the liberated $H_2S$ reacts with the test iron oxide to produce an acid-stable product of reaction, it will be fixed in the reaction vessel and will not pass into the zinc carbonate trap.

For purpose of this application and its claims, products of reaction are to be deemed to be acid-stable if they are at least 70% stable in the presence of strong acid when tested by the foregoing assay.

The results of tests are given in Table I and are expressed as the percent of total sulfides derived from FeS which remain fixed in the reaction vessel upon acidification and are not released as $H_2S$ into the zinc carbonate trap. From the data of Table I, each of the classes of compounds A-D, effective in the present process, forms reaction products at least 70% stable in the presence of strong acids. In contrast, all the prior art compounds and control materials yield reaction products only about 10% to 20% stable in the presence of acid. Such reaction products, even if formed under alkaline conditions, pose a future danger of regenerating hydrogen sulfide upon contact with acidic compounds in the environment.

Where very rapid reaction rates are desired, impurity levels of various elements in bulk may significantly affect scavenging efficiency. Even compounds having large surface area (greater than 4 m$^2$/g) and the characteristic Fe$_2$O$_3$ or Fe$_3$O$_4$ crystalline phase as hereinabove described, are presently deemed to be unsatisfactory in the present process if any free element of impurity exceeds about 10% by weight. For example, all the control prior art iron oxides designated Q and R of Table I have greater than 10% by weight of at least one such element; all of them have correspondingly low kinetic K values of reaction during the course of continuous flow reaction at acidic pH. In contrast, compounds A-D are found to have low levels of such bulk impurities (less than about 5% by weight) as measured by X-ray fluorescence, these compounds attain a kinetic K value of at least 20 at acidic pH during the course of continuous flow reaction.

The surface area of iron oxides is correlated with their chemical reactivity. Highly dense crystalline compounds such as magnetite or hematite have very low surface area, generally less than 1.0 m$^2$/g, and corresponding low reactivity with hydrogen sulfide. Low reactivity thus reflects both the smaller effective surface area available for reaction and the relatively low free energy of these substances due to crystalline lattice bonding. The present iron oxides, useful in the present process, may therefore be characterized or defined by the presence of substantial amorphous iron oxide content, or alternatively by their effective surface area and low density. Reactive compounds will generally have a surface area of greater than 4 m$^2$/g and have a lesser density than that of crystalline hematite or magnetite; or reveal a substantial amorphous portion together with a crystalline iron oxide phase upon the more elaborate analysis by ESCA/AUGER, X-ray diffraction, and ion titration analysis hereinabove described.

In the method of the present invention, iron oxide particles are added to a liquid to form a slurry or suspension. Hydrocarbon gas is contacted with the slurry so as to react any hydrogen sulfide present with the particles. Any apparatus adapted to bring a liquid phase into intimate contact with the gas phase will be effective in this method, as scrubbing columns, static mixers, bubble vessels, and the like. The sweetened hydrocarbon gas then passes from the liquid slurry and is collected conventionally as it escapes from the slurry.

Contrary to prior art teachings, the slurry of the present process may utilize any liquid capable of practical use with the aforementioned apparatus. In experiments utilizing a Parr pressure bomb apparatus, recovery of sulfur-containing solids was fully as efficient where anhydrous diesel fuel was substituted for water in forming a test slurry of dessicated iron oxide of the type designated compounds A-D, residual water content of dessicated samples was less than 0.2%. These results were not to be expected, in view of Simon and Reichelt [Z. anerg. allg. Chem. 319:962 (1964)] which teaches that iron oxide reacts with hydrogen sulfide by being first hydrated to FeOOH; that the hydrogen sulfide becomes ionized to form HS$^-$ and H$^+$; and the reaction proceeds between the FeOOH and the HS$^-$, at an optimum water content of 18.0%.

I claim:

1. The process of scavenging hydrogen sulfide from hydrocarbon gas comprising the following steps:
    (a) forming a liquid slurry of iron oxide particles having a surface area of at least 4 m$^2$/g comprising
        (1) a crystalline phase portion selected from the group consisting of Fe$_2$O$_3$, Fe$_3$O$_4$, and combinations thereof, together with
        (2) an amorphous Fe$_2$O$_3$ portion
    (b) contacting with said slurry hydrocarbon gas containing hydrogen sulfide,
    (c) reacting such hydrogen sulfide with said particles to form substantially acid-stable products of reaction, and
    (d) collecting the hydrocarbon gas escaping from said slurry.

2. The process of scavenging hydrogen sulfide from hydrocarbon gas comprising the steps of
    (a) contacting hydrogen sulfide contained in such hydrocarbon gas with a liquid slurry of iron oxide particles comprising substantially a crystalline phase of Fe$_2$O$_3$, Fe$_3$O$_4$, and combinations thereof, said particles having a surface area of at least 4 m$^2$/g, and having impurity levels of any free element in bulk of less than 10.0% by weight,
    (b) reacting said particles with such hydrogen sulfide in a reaction which, if measured intermittently during the course of continuous flow reaction, attains a kinetic K value greater than 20, and
    (c) collecting the hydrocarbon gas escaping from said slurry.

3. The process of scavenging hydrogen sulfide from hydrocarbon gases comprising the following steps:
    (a) forming a liquid slurry of iron oxide particles having an FE$^{+++}$ content intermediate to that for pure standards of Fe$_2$O$_3$ and Fe$_3$O$_4$, said particles having a surface area of at least 4 m$^2$/g,
    (b) contacting with said slurry hydrocarbon gas containing hydrogen sulfide,
    (c) reacting such hydrogen sulfide with said particles to form acidstable products of reaction, and
    (d) collecting the hydrocarbon gas escaping from said slurry.

4. The process of claim 1, wherein said iron oxide particles comprise substantially a crystalline Fe$_3$O$_4$ core together with an amorphous Fe$_2$O$_3$ portion.

5. The process of scavenging hydrogen sulfide from hydrocarbon gases comprising the following steps:
    (a) forming a liquid suspension of iron oxide particles having an Fe$^{+++}$ content intermediate to that for pure standards of Fe$_2$O$_3$ and Fe$_3$O$_4$, said particles having a crystalline phase comprised substantially of Fe$_3$O$_4$ with lesser amounts of Fe$_2$O$_3$, and having a surface area of at least 4 m$^2$/g,
    (b) contacting hydrogen sulfide contained in such hydrocarbon gas with said suspension, and
    (c) reacting said particles with such hydrogen sulfide to form acidstable products of reaction, and
    (d) collecting the hydrocarbon gas escaping from said suspension.

6. The process of scavenging hydrogen sulfide from hydrocarbon gases comprising the following steps:
    (a) forming a liquid slurry of iron oxide particles having an Fe$^{+++}$ content intermediate to that for pure standards of Fe$_2$O$_3$ and Fe$_3$O$_4$, said particles having a surface area of at least 4 m$^2$/g, and having impurity levels of free elements in bulk of less than 10.0% by weight.

(b) contacting hydrogen sulfide contained in such hydrocarbon gas with said slurry, and (c) reacting said particles with such hydrocarbon sulfide in a reaction attaining a kinetic K value of at least 20 during the course of continuous acidic reaction, and (d) collecting the hydrocarbon gases escaping from said slurry.

7. The process of claims 1, 2, 3, 5 or 6 wherein said liquid is water.

8. The process of claims 1, 2, 3, 5 or 6 wherein said liquid is a hydrocarbon-based oil.

9. The process of claims 1, 2, 3, 5 or 6 wherein said iron oxide is basic oxygen furnace dust.

10. The process of claims 1, 2, 3, 5 or 6 wherein said iron oxide particles are open hearth dust.

* * * * *

UNITED STATES PATENT AND TRADEMARK OFFICE
CERTIFICATE OF CORRECTION

PATENT NO. : 4,246,244
DATED : January 20, 1981
INVENTOR(S) : Irwin Fox

It is certified that error appears in the above—identified patent and that said Letters Patent is hereby corrected as shown below:

Column 2, line 32, add the word ---oxide--- after "iron";

Column 3, line 18, add the word ---certain--- after "together with";

Column 8, line 43, change "acidstable" to ---acid-stable---;
   line 60, change "acidstable" to ---acid-stable---;

Column 9, line 2, change "." to ---,---; line 6, change "hydrocarbon" to ---hydrogen---.

Signed and Sealed this

Nineteenth Day of May 1981

[SEAL]

Attest:

RENE D. TEGTMEYER

Attesting Officer     Acting Commissioner of Patents and Trademarks